United States Patent
Hessbrüggen et al.

(10) Patent No.: US 6,783,444 B2
(45) Date of Patent: Aug. 31, 2004

(54) TOOL FOR MACHINING SURFACES IN BORES

(75) Inventors: Norbert Hessbrüggen, Eschenbach (DE); Christoph Wernz, Stuttgart (DE)

(73) Assignee: Reinecker Kopp Werkzeugmaschinen GmbH, Neu-Ulm (DE)

( * ) Notice: Subject to any disclaimer, the term of this patent is extended or adjusted under 35 U.S.C. 154(b) by 237 days.

(21) Appl. No.: 09/999,308

(22) Filed: Oct. 31, 2001

(65) Prior Publication Data

US 2002/0182989 A1 Dec. 5, 2002

(30) Foreign Application Priority Data

Oct. 31, 2000 (DE) .......................................... 100 54 122

(51) Int. Cl.$^7$ .............................................. B24B 7/00
(52) U.S. Cl. ...................... 451/178; 451/180; 451/231; 451/358; 407/33
(58) Field of Search .................................. 451/178, 180, 451/231, 344, 358; 407/33, 42, 53

(56) References Cited

U.S. PATENT DOCUMENTS

| 1,735,841 A | 11/1929 | Von Neudeck |
| 5,065,546 A | 11/1991 | Lorenz |

FOREIGN PATENT DOCUMENTS

| DE | 419416 | 11/1924 |
| DE | 198 04 236 | 7/1999 |
| EP | 0 855 246 | 7/1998 |
| JP | 09-201767 | 8/1997 |

*Primary Examiner*—Eileen P. Morgan
(74) *Attorney, Agent, or Firm*—Cohen, Pontani, Lieberman & Pavane

(57) ABSTRACT

The tool comprises a tool wheel (5) which is mounted on a holding arm (4) and has a tool-wheel parent body (6) having a machining body (7) arranged at the outer margin. In one embodiment variant, this machining body is designed as an abrasive body. A base body for accommodating the bearing arrangement is designed in one piece with the holding arm (4), which also has the supply lines (8) for the hydrodynamic bearing arrangement and the hydraulic drive. A tool-centering interface (11) permits the presetting of the tools outside the machine tool.

19 Claims, 6 Drawing Sheets

TOOL FOR MACHINING SURFACES IN BORES

BACKGROUND OF THE INVENTION

1. Field of the Invention

The invention relates to a tool for machining surfaces, in particular recesses, in bores of workpieces, having a tool wheel which is mounted in a rotatable manner on a holding arm and whose diameter exceeds the dimension of the holding arm transversely to the longitudinal direction of the same.

2. Description of the Related Art

DE 419 416 C discloses a grinding device having a turbine drive, in which grinding device the turbine wheels lie open for driving the grinding wheel, so that the drive medium discharges freely. Furthermore, the grinding wheel projects to a considerable extent on both sides of the holding arm, so that this holding arm, which is thin relative to the grinding-wheel diameter and in addition is also of fork-shaped design, does not have the necessary rigidity which is required for accurate machining. Furthermore, the open airflow or spray against the turbine blades limits the power transmission, for which reason a turbine of relatively large diameter is used, this turbine requiring an even larger grinding wheel, so that, during the machining of surfaces in bores, there are restrictions with regard to the inside diameter of these bores.

SUMMARY OF THE INVENTION

The object of the invention is to design a tool of the specified type in such a way that, at a relatively low design cost, small external dimensions for the machining inside small bores and relatively large chip-removing capacities can be achieved.

According to the invention, the tool wheel has a hollow tool-wheel carrier having an essentially rotationally symmetrical form and a machining body arranged on the outer periphery of the same, and the tool-wheel carrier together with a base body provided on the holding arm from a housing for accommodating the bearing arrangement and the drive for the tool wheel. The machining body projects beyond the outer dimension of the holding arm transversely to the longitudinal direction of the same only by slightly more than corresponds to the recess inside the bore of the workpiece, and the machining body projects beyond the holding arm only on one side of the latter.

The term "recess" refers to a groove or an internal thread.

The invention enables machining of longitudinal grooves in narrow bores, with an orientation of the grooves parallel to or at an angle to the bore axis, and the machining of thread turns, since this configuration offers compact external dimensions. Since the tool wheel is only slightly larger than corresponds to the dimension of the holding arm, the latter has high rigidity, as a result of which vibration-free machining of workpieces is possible. The interaction of the hollow rotationally symmetrical tool wheel with the base body of the holding arm creates a configuration which offers not only compact external dimensions but also protected arrangement of the bearing arrangements of the drive.

Since the tool wheel projects beyond the holding arm only on one side of the latter, especially narrow bores can be machined, since a clearance space between holder and inner bore is only required on the one side, at which the tool wheel projects beyond the holding arm.

The configuration of the tool wheel as a hollow rotationally symmetrical body provides the precondition for the machining body to be designed as an abrasive body or as a milling cutter.

An especially advantageous configuration with regard to achieving compact external dimensions is obtained if the tool-wheel carrier is of hemispherical or frustoconical design. This configuration is especially advantageous in combination with the design of the drive as a hydraulic drive, since in this way the space available can be utilized in an especially effective manner for the drive pails and also for the bearing parts.

Furthermore, it is advantageous if a projecting, bead-shaped abrasive-material support, which carries the abrasive material, is formed in one piece at the outer margin of the tool-wheel carrier, the abrasive-material support and abrasive material forming the machining body. This configuration leads in particular to a compact embodiment when, in a development of the invention, the tool-wheel carrier and the abrasive-material support are designed as a metal body, and the abrasive material is electrolytically applied to the abrasive-material support. The abrasive material may also be applied to the abrasive-material support by means of ceramic bonding, metallic bonding or synthetic resin bonding. The abrasive material may consist of cubic boron nitride or diamond. The metal body is preferably formed from steel. Such a tool provided as a grinding tool not only has compact external dimensions but also a very long service life on account of the abrasive material used.

When the grinding wheel or the milling cutter wears down, an exchange can easily be carried out on account of the configuration according to the invention, since in this case the tool-wheel carrier with the integrally formed machining body is connected as a unit to the remaining parts of the tool in an easily exchangeable manner.

A further simplification of the design is provided for by the base body being designed in one piece with the holding arm, which accommodates supply lines for the drive and/or the bearing arrangement.

If, in a further configuration of the invention, the bearing arrangement of the tool wheel is designed as a hydrodynamic bearing arrangement and the drive for the tool wheel is designed as a hydraulic drive, the oil required for the hydraulic drive may serve as lubricant for the hydrodynamic bearing arrangement of the tool wheel, a factor which reduces the design cost overall. With small dimensions, very high torques and thus high outputs can be transmitted to the tool wheel through the use of a hydraulic drive. Compared with the mechanical drives, the hydraulic drive for such a tool also has the advantage that, if the tool wheel stops suddenly, the drive cannot be damaged, as is the case in the mechanical drives on account of mass forces.

It is advantageous if the holding arm is provided with a tool-centering interface for securing to a machine tool, since the tool can be preset as a result.

DETAILED DESCRIPTION OF THE PRESENTLY PREFERRED EMBODIMENTS

Figure 1:
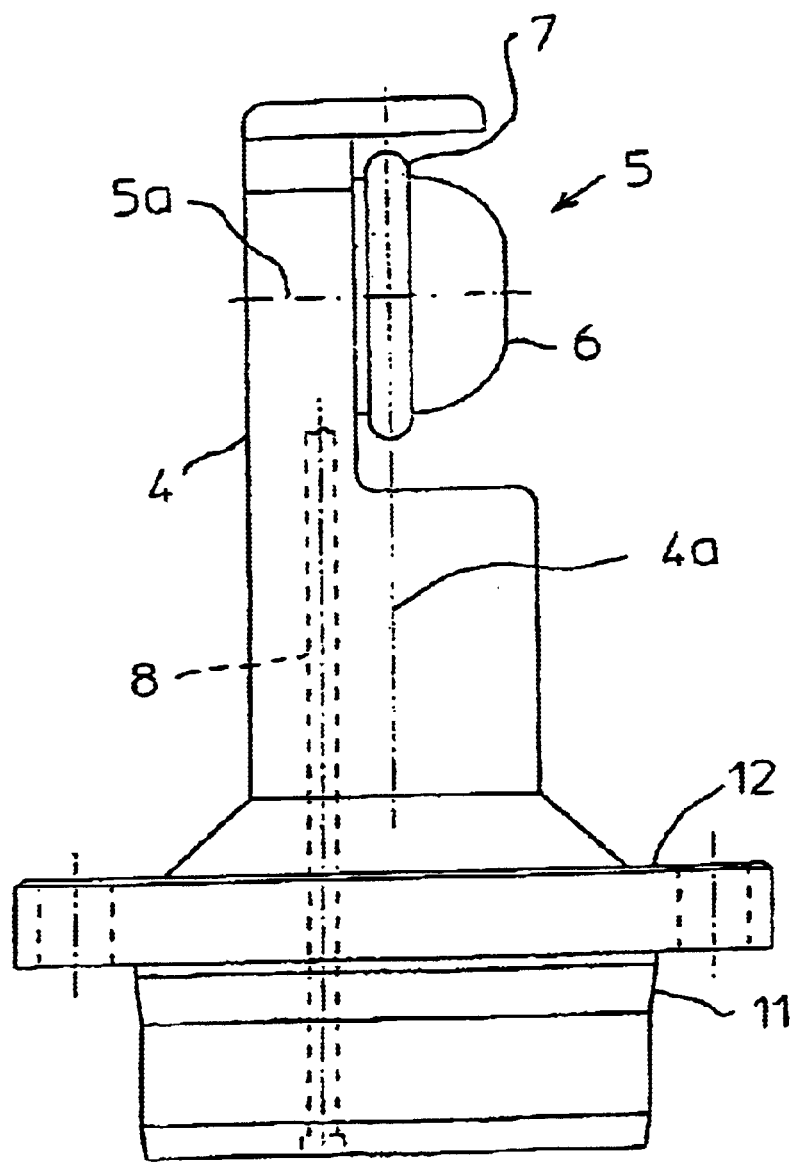
FIG. 1 shows a side view of a tool with a workpiece indicated by broken lines.
Figure 2:
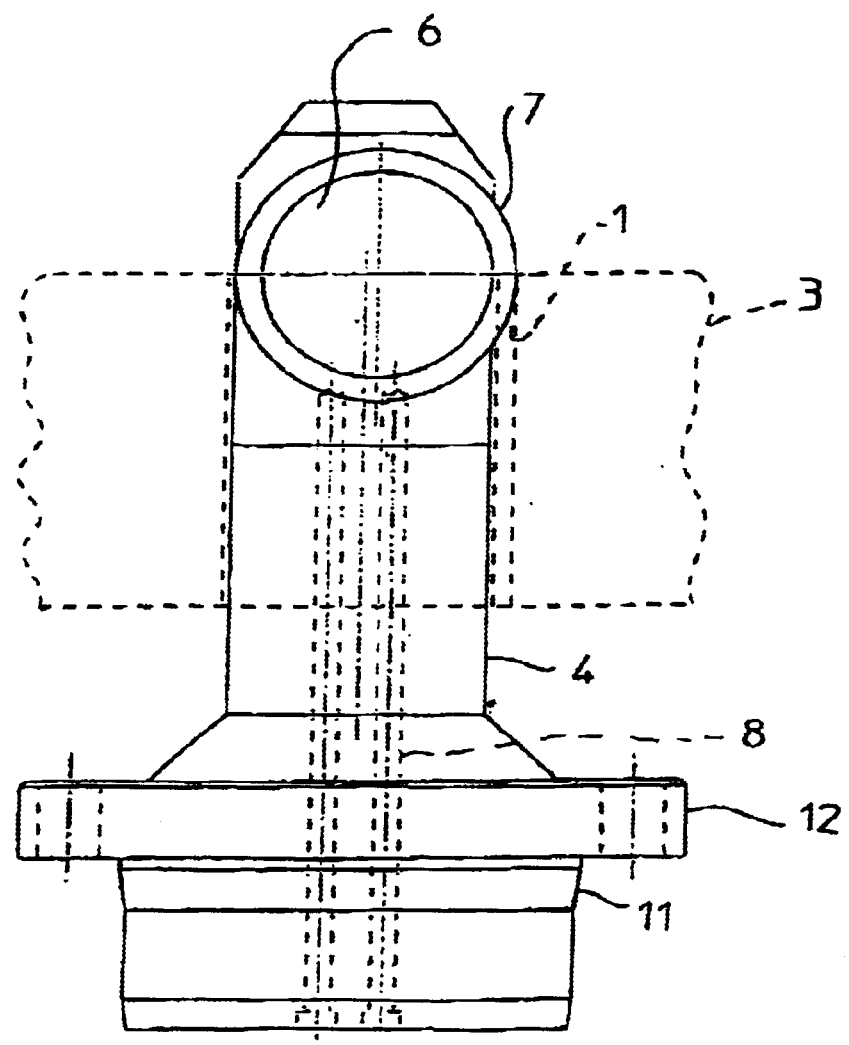
FIG. 2 shows a view of the tool according to FIG. 1 rotated through 90°.
Figure 3:
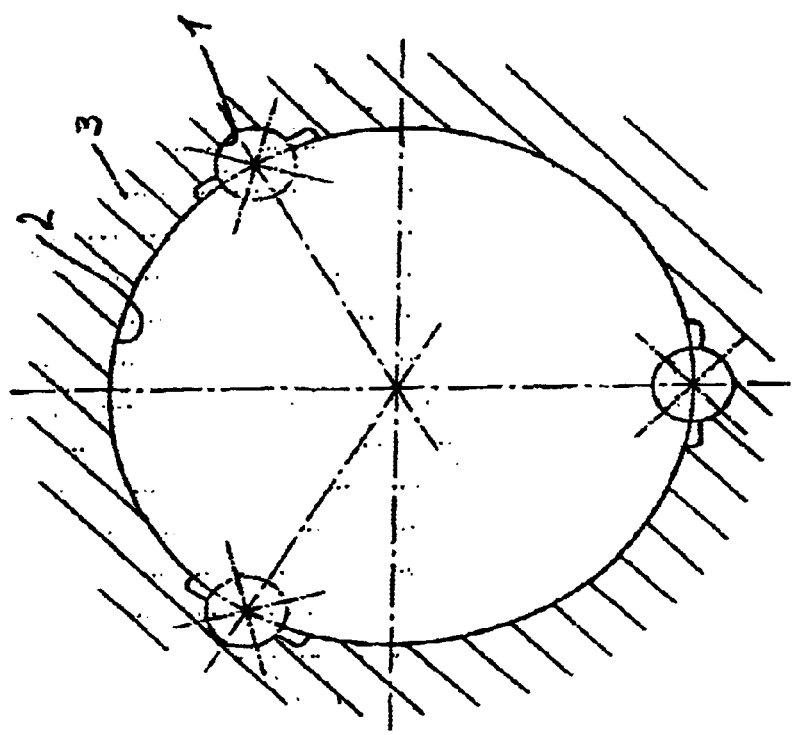
FIG. 3 shows a section through the workpiece, indicated schematically in FIG. 1, in an enlarged representation.

The tool shown in FIGS. 1 and 2 is designed as a grinding tool and serves in particular to machine grooves 1 inside an inner bore 2 of a workpiece 3, which is indicated by broken lines in FIG. 2 and is shown in section in an enlarged representation in FIG. 3.

Figure 4:
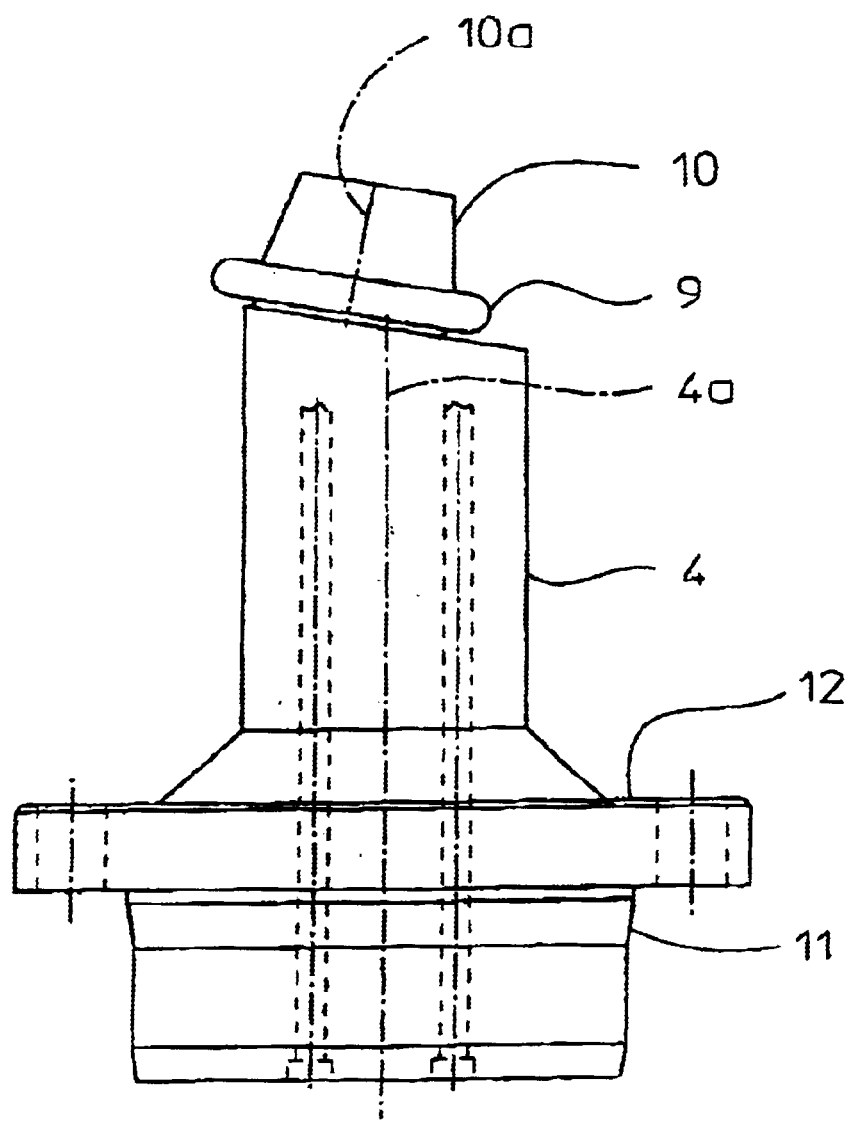
FIG. 4 shows a modified embodiment compared with FIGS. 1 and 2.

As can be seen from FIGS. 1 and 2, and 4, the tool comprises a holding arm 4 and a tool wheel, which is designated overall by 5 and has a tool-wheel carrier 6. The longitudinal axis of the holding arm is designated by 4a and, in the embodiment according to FIGS. 1 and 2, encloses a right angle with the bearing axis 5a of the tool wheel 5, which in this case is designed as a grinding wheel. An abrasive-material support 7 is formed in one piece on the outer periphery of the tool-wheel carrier 6 and carries, for example, electrolytically applied cubic born nitride. The abrasive-material support 7 and the applied hard particles of boron nitride form the machining body or that part of the grinding tool which is in engagement with the workpiece to be machined. The tool-wheel carrier 6 is made of metal, preferably steel, and, in the embodiment according to FIGS. 1 and 2 and in the embodiment according to FIG. 6, is designed essentially as a rotationally symmetrical, hemispherical hollow body. In the exemplary embodiment according to FIG. 4, the tool-wheel carrier 10 is of frustoconical design. In the case of the exemplary embodiments according to FIGS. 4 to 6, a milling cutter 9 is provided at the outer margin of the tool-wheel carrier 6 instead of the abrasive-material support 7. In the embodiment according to FIGS. 1 and 2, the abrasive-material support 7 may be replaced with a milling cutter.

The tool-wheel carrier 6 or 10 forms a housing for a drive and the bearing arrangement of the tool-wheel carrier 6 or 10 and thus of the machining body 7 or 9. This housing interacts with a base body which is formed by the holding arm 4. Provided inside this holding arm 4 are supply lines 8 which direct hydraulic oil to the drive motor, which is designed as a hydraulic drive motor, and in addition the bearing arrangement, which is designed as a hydrodynamic bearing arrangement, is also supplied as a result.

As can be seen from FIG. 2, the tool wheel 5, that is to say the grinding wheel 5 in the present exemplary embodiment, is arranged on the holding arm 4 in such a way that it only projects at one side edge in accordance with the radial extent of the bead-shaped abrasive-material support 7. In this way, the opposite side of the holder 4, when being inserted into the bore 2 of the workpiece 3, can virtually bear against the inner wall 2 when one of the grooves 1 is to be machined.

The holding arm 4 shown in FIGS. 1 and 2 has a substantially cylindrical shape with a cylindrical axis which corresponds to the longitudinal axis 4a. As shown in FIG. 1, the machining body 7 lies substantially in the plane of the axis 4a, the bearing axis 5a being substantially perpendicular to this plane.

Figure 5:
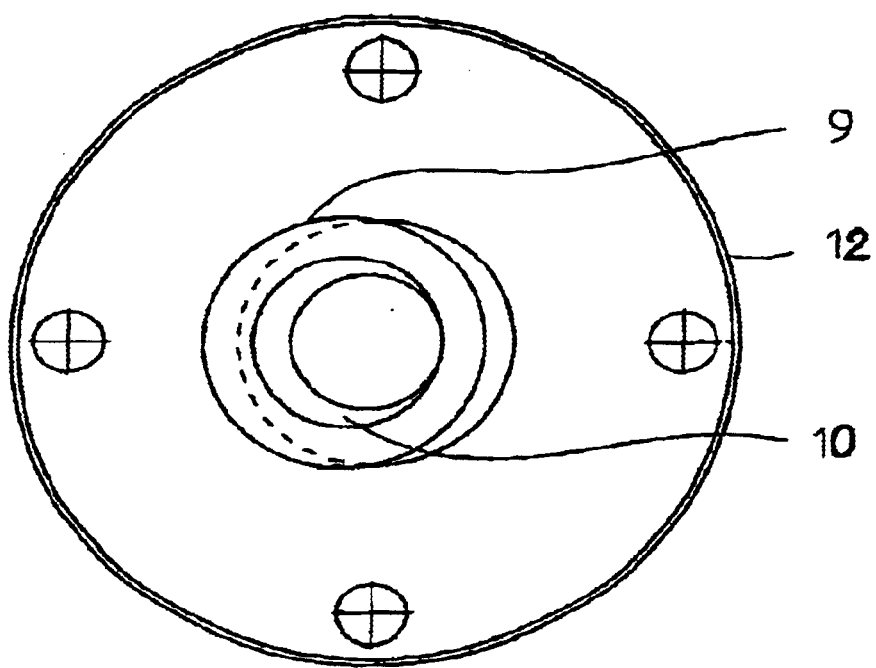
FIG. 5 shows a front view in the axial direction of the tool holder.
Figure 6:
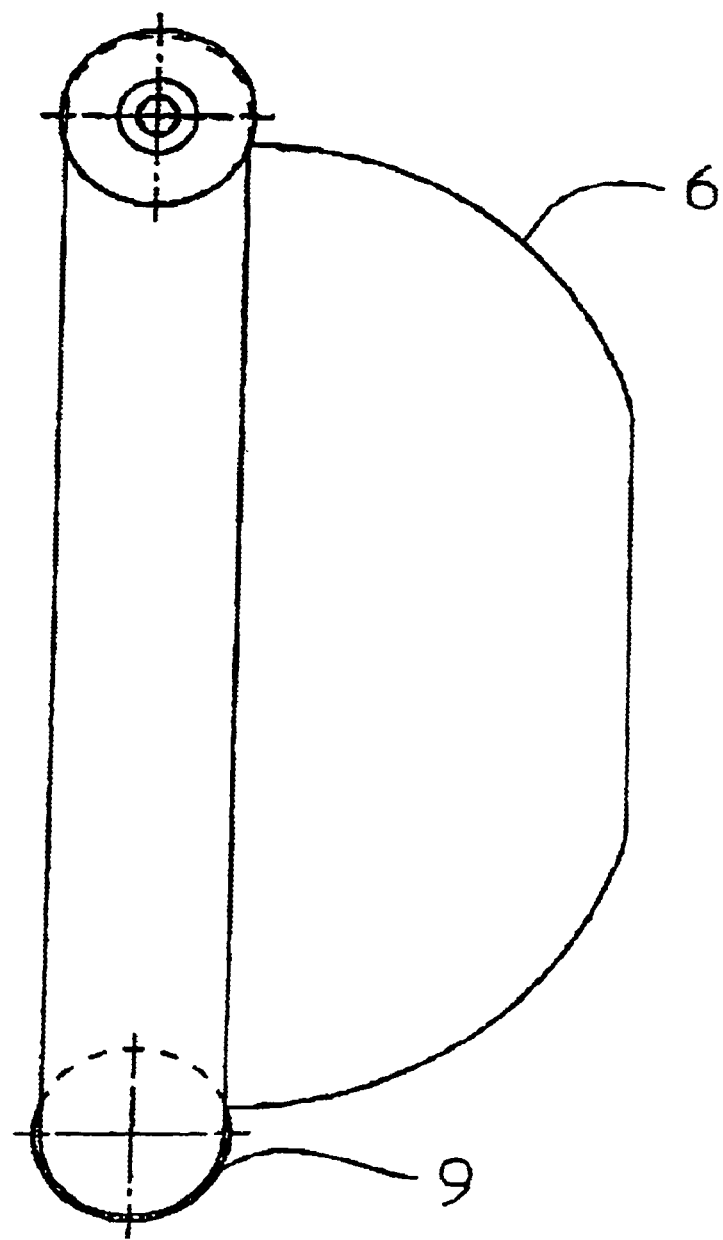
FIG. 6 shows a modified embodiment, compared with FIG. 1, of a tool wheel on an enlarged scale.

In the tool according to FIGS. 4 and 5, the bearing axis 10a of the carrier 10 forms an acute angle with the longitudinal axis 4a of the holding arm 4. The angular setting of the bearing axis relative to the longitudinal axis of the holding arm depends on the field of use of the respective tool. Here, too, the milling cutter may be arranged in such a way that it projects beyond the holding arm 4 only at one side edge of the latter.

A tool-centering interface 11 is formed directly on a fastening flange 12 at the end of the holding arm 4. As a result, the tools can be preset, so that, after the fastening of the tool to a corresponding machine tool by means of the fastening flange 12, they already have the setting necessary for the machining.

What is claimed is:

1. A tool for machining a recess in the bore of a workpiece, said tool comprising a holding arm having a longitudinal axis and a dimension transverse to said longitudinal axis, and a tool wheel mounted for rotation on said holding arm about a bearing axis which is transverse to and offset from the longitudinal axis of the holding arm, said tool wheel comprising a rotationally symmetric hollow carrier which, with said holding arm, forms a housing for accommodating a bearing arrangement and a drive for the tool wheel, said tool wheel further comprising a machining body arranged on the outer circumference of said carrier and projecting beyond the transverse dimension of the holding arm on only one side of the holding arm, whereby said tool may be used to machine a recess in the bore of a workpiece, said recess having a depth corresponding to the projection of said machining body beyond said holding arm.

2. A tool as in claim 1 wherein said machining body comprises an abrasive body.

3. A tool as in claim 1 wherein the machining body comprises a milling cutter.

4. A tool as in claim 1 wherein the carrier has a hemispherical shape.

5. A tool according to claim 1 wherein said carrier has a frustoconical shape.

6. A tooling according to claim 2 wherein said machining body further comprises a bead shaped abrasive material support formed in one piece at the circumference of said carrier, said abrasive material support carrying said abrasive material.

7. A tool according to claim 6 wherein the carrier and the abrasive material support are integrally formed as a metal body, said abrasive material being applied to said abrasive material support electrolytically.

8. A tool according to claim 6 wherein said abrasive material is applied to said abrasive material support by ceramic bonding.

9. A tool according to claim 6 wherein said abrasive material is applied to said abrasive material support by metallic bonding.

10. A tool according to claim 6 wherein said abrasive material is applied to said abrasive material support by synthetic resin bonding.

11. A tool according to claim 6 wherein said abrasive material consists of cubic boron nitride.

12. A tool according to claim 6 wherein said abrasive material consists of diamond.

13. A tool according to claim 7 wherein said metal body is made of steel.

14. A tool according to claim 1 further comprising a hydraulic drive for said tool wheel.

15. A tool according to claim 14 further comprising a hydrodynamic bearing for said tool wheel.

16. A tool according to claim 14 wherein said holding arm accommodates hydraulic supply lines for said hydraulic drive.

17. A tool according to claim 1 wherein said holding arm comprises a tapered tool-centering interface for securing to a machine tool, said interface being symmetric to said longitudinal axis.

18. A tool according to claim 1 wherein said holding arm has a cylindrical shape with a cylindrical axis corresponding to said longitudinal axis and a circumference, said machining body extending beyond said circumference.

19. A tool according to claim 18 wherein the machining body is substantially coplanar with the longitudinal axis of the holding arm.

* * * * *